United States Patent
Abdulkader et al.

(10) Patent No.: US 11,380,315 B2
(45) Date of Patent: *Jul. 5, 2022

(54) CHARACTERIZING ACCURACY OF ENSEMBLE MODELS FOR AUTOMATIC SPEECH RECOGNITION BY DETERMINING A PREDETERMINED NUMBER OF MULTIPLE ASR ENGINES BASED ON THEIR HISTORICAL PERFORMANCE

(71) Applicant: Cisco Technology, Inc., San Jose, CA (US)

(72) Inventors: Ahmad Abdulkader, Palo Alto, CA (US); Mohamed Gamal Mohamed Mahmoud, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 16/297,602

(22) Filed: Mar. 9, 2019

(65) Prior Publication Data

US 2020/0286476 A1 Sep. 10, 2020

(51) Int. Cl.
| | |
|---|---|
| *G10L 15/32* | (2013.01) |
| *G10L 15/22* | (2006.01) |
| *G06F 40/194* | (2020.01) |
| *G10L 25/60* | (2013.01) |
| *G06K 9/62* | (2022.01) |
| *G10L 15/06* | (2013.01) |
| *G10L 15/26* | (2006.01) |

(52) U.S. Cl.
CPC ............ *G10L 15/22* (2013.01); *G10L 15/063* (2013.01); *G10L 15/26* (2013.01); *G10L 15/32* (2013.01); *G10L 2015/0635* (2013.01)

(58) Field of Classification Search
CPC ......... G10L 15/32; G10L 25/60; G10L 15/22; G06F 40/194; G06K 9/6287
USPC ............................................ 704/235, 1, 232
See application file for complete search history.

(56) References Cited

U.S. PATENT DOCUMENTS

| | | | | |
|---|---|---|---|---|
| 5,509,103 | A * | 4/1996 | Wang .................. | G06K 9/6287 704/232 |
| 10,529,324 | B1 * | 1/2020 | Chopra ................. | G10L 15/22 |
| 10,937,444 | B1 * | 3/2021 | Suendermann-Oeft ..................... G10L 25/60 |
| 2006/0190249 | A1 * | 8/2006 | Kahn .................... | G06F 40/194 704/235 |
| 2006/0247912 | A1 * | 11/2006 | Suzuki .................. | G06F 40/194 704/1 |
| 2016/0372107 | A1 | 12/2016 | Dow et al. | |

(Continued)

OTHER PUBLICATIONS

International Search Report and Written Opinion issued in PCT/US2020/019960 dated Jun. 17, 2020, 12 pages.

*Primary Examiner* — Farzad Kazeminezhad
(74) *Attorney, Agent, or Firm* — Merchant & Gould P.C.

(57) ABSTRACT

One embodiment of the present invention sets forth a technique for analyzing a transcription of a recording. The technique includes generating features representing transcriptions produced by multiple automatic speech recognition (ASR) engines from voice activity in the recording and a best transcription of the recording produced by an ensemble model from the transcriptions. The technique also includes applying a machine learning model to the features to produce a score representing an accuracy of the best transcription. The technique further includes storing the score in association with the best transcription.

20 Claims, 6 Drawing Sheets

(56) References Cited

U.S. PATENT DOCUMENTS

2017/0140752 A1* 5/2017 Sugitani .................. G10L 15/32
2018/0096678 A1   4/2018 Zhou et al.
2018/0137857 A1* 5/2018 Zhou ....................... G10L 15/32

* cited by examiner

CHARACTERIZING ACCURACY OF ENSEMBLE MODELS FOR AUTOMATIC SPEECH RECOGNITION BY DETERMINING A PREDETERMINED NUMBER OF MULTIPLE ASR ENGINES BASED ON THEIR HISTORICAL PERFORMANCE

BACKGROUND

Field of the Various Embodiments

Embodiments of the present invention relate generally to text and speech analytics, and more particularly, to characterizing accuracy of ensemble modeling of automatic speech recognition output.

Description of the Related Art

Recent technological advances have allowed meetings to be conducted more efficiently and effectively. For example, network-enabled devices have been deployed with solutions that allow people to conduct teleconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, individual automatic speech recognition (ASR) engines used to generate transcripts from meetings or other recordings can vary in performance under different conditions. For example, ASR engines may vary in their ability to recognize speech across different languages, vocabularies, accents, dialects, voices, speech patterns, and/or audio characteristics.

As the foregoing illustrates, what is needed is a technological improvement for improving the performance of ASR engines under varying conditions.

SUMMARY

One embodiment of the present invention sets forth a technique for analyzing a transcription of a recording. The technique includes generating features representing transcriptions produced by multiple automatic speech recognition (ASR) engines from voice activity in the recording and a best transcription of the recording produced by an ensemble model from the transcriptions. The technique also includes applying a machine learning model to the features to produce a score representing an accuracy of the best transcription. The technique further includes storing the score in association with the best transcription.

At least one advantage and technological improvement of the disclosed techniques is increased accuracy of the ensemble model, which may reduce reliance on human transcriptions of the recordings and/or improve the usefulness of the best transcriptions to users. Consequently, the disclosed techniques provide technological improvements in the accuracy and/or performance of ASR engines, ensemble models, interactive virtual meeting assistants, and/or other applications or devices that are used to manage, review, and/or analyze recordings or transcriptions of meetings or other types of events.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
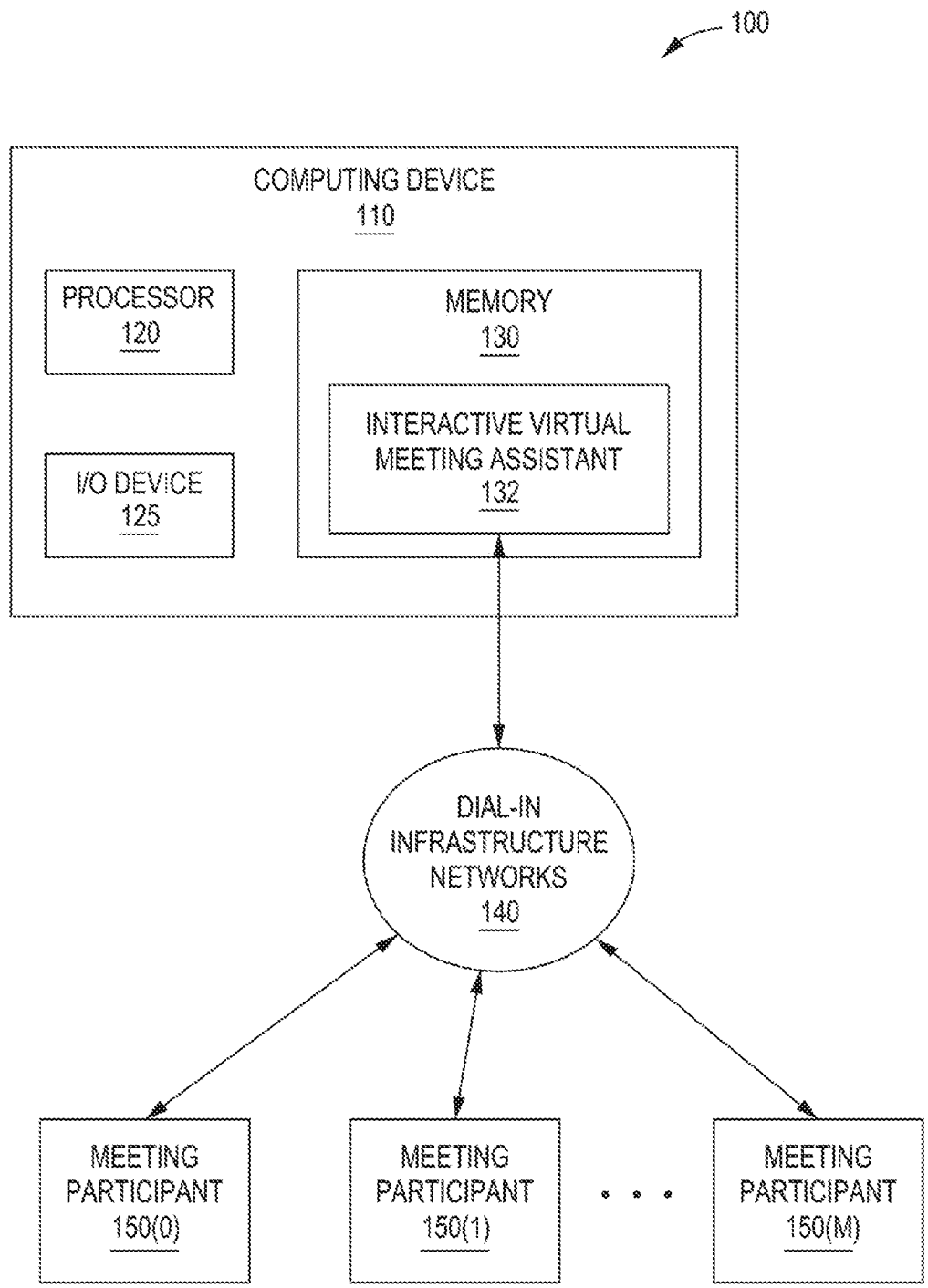
FIG. 1 is a block diagram illustrating a system configured to implement one or more aspects of the present invention.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to generate, track, and/or store metadata and recordings related to a meeting. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. Interactive virtual meeting assistant 132 may also, or instead, capture audio and/or video of the meeting; record notes or action items generated during the meeting; and/or generate a transcript from the audio and/or video recording of the meeting, as described in further detail below with respect to FIG. 2. Interactive virtual meeting assistant 132 may further record "highlights" that are flagged by one or more meeting participants 150(0) to 150(m) as important. A meeting participant may activate recording of a highlight by issuing a voice command and/or other type of input to interactive virtual meeting assistant 132.

Characterizing Accuracy of Ensemble Models for Automatic Speech Recognition

Figure 2:
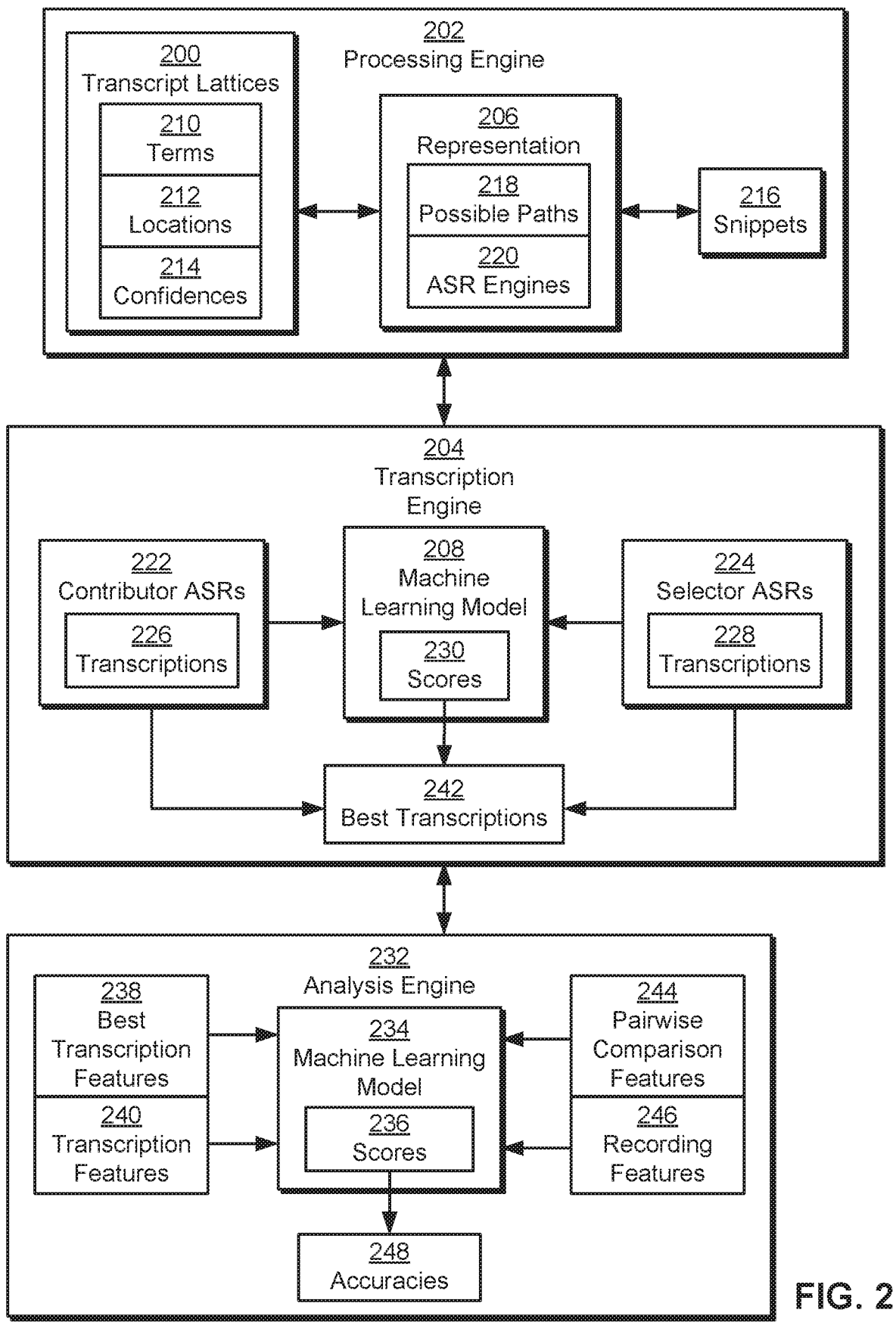
FIG. 2 is a more detailed illustration of functionality provided by the interactive virtual meeting assistant of FIG. 1, according to various embodiments of the present invention.

FIG. 2 is a more detailed illustration of functionality provided by interactive virtual meeting assistant 132 of FIG. 1, according to various embodiments of the present invention. As shown, the functionality may be provided by a processing engine 202, a transcription engine 204, and an analysis engine 232, which can be implemented as part of and/or separately from interactive virtual meeting assistant 132. Each of these components is described in further detail below.

As mentioned above, interactive virtual meeting assistant 132 may include functionality to generate a transcript of a recording of a meeting (or any other type of activity or event). More specifically, interactive virtual meeting assistant 132 may use ensemble modeling of automatic speech recognition (ASR) output to assemble the transcript from multiple possible transcriptions 226-228 generated by a number of ASR engines 220 (individually referred to as an "ASR engine 220") from the recording. Each ASR engine 220 may utilize a different model and/or technique to transcribe the recording. As a result, ASR engines 220 may differ in performance based on languages, vocabularies, accents, dialects, voices, speech patterns, volume, noise, distortions, audio quality, and/or other conditions associated with or found in the recording.

Processing engine 202 may execute or otherwise use ASR engines 220 to generate transcriptions 226-228 of the recording. For example, processing engine 202 may execute ASR engines 220 to generate transcript lattices 200. Processing engine 202 may also, or instead, obtain one or more transcript lattices 200 from ASR engines 220 that execute independently from processing engine 202.

Each transcript lattice includes a set of terms 210, locations 212 of terms 212 in the recording, and confidences 214 in terms 210. Terms 210 may include words, phrases, morphemes, n-grams, syllables, phonemes, and/or other representations of speech or text that is extracted from the recording. When ASR techniques are used to generate non-word terms 210 (e.g., morphemes, phonemes, syllables, etc.) from the recording, the non-word terms may be converted into words. The words may then be included in the corresponding transcript lattices 200, in lieu of or in addition to the non-word terms used to produce the words.

Locations 212 may represent the positions of terms 210 in the recording. For example, each location may specify a start and end timestamp for each term, a start timestamp and a duration for each term, and/or another representation of the portion of the recording occupied by the term.

Confidences 214 may include measures of accuracy in terms 210 generated by the ASR techniques from the recording. For example, each confidence may be represented by a value with a range of 0 to 1, which represents the probability that a word predicted by the corresponding ASR engine exists at the corresponding location.

After terms 210, locations 212, and confidences 214 are generated in each transcript lattice, the transcript lattice may be represented as a Weighted Finite-State Transducer and/or other type of graph. Nodes in the graph may represent states, and edges in the graph may represent transitions between pairs of states. For example, each edge in a lattice may be represented using the following format:

<start state id> <end state id> <input symbol> <output symbol> <weight>

In the above representation, the edge connects two states represented by "start state id" and "end state id." The "input symbol" may represent an identifier for the edge, and the "output symbol" may represent an identifier for a word. The "weight" may encode one or more probabilities, duration, penalty, and/or other quantity that accumulates along one or more paths representing transcriptions of words, phrases and/or other units of speech in the recording.

In turn, processing engine 202 may combine terms 210, locations 212, and/or confidences 214 from transcript lattices 200 into a unified representation 206 of all transcriptions 226-228 produced by ASR engines 220 from the recording. Representation 206 may include all possible paths 218 formed by a graph of terms 210 in each transcript lattice, according to locations 212 of terms 210 in the transcript lattice. For example, a recording containing the phrase "hi there" may include the following possible paths 218 in representation 206:

hi there
hi the
high there
high the

In other words, each possible path in representation 206 may include a linear sequence of consecutive, non-overlapping terms 210 from a corresponding transcript lattice.

Processing engine 202 may also associate possible paths 218 in representation 206 with the corresponding ASR engines 220. For example, processing engine 202 may store, in representation 206, a mapping of each possible path to identifiers for one or more ASR engines used to produce the path.

Processing engine 202 further identifies portions of possible paths 218 that pertain to snippets 216 of voice activity in the recording. For example, processing engine 202 and/or another component may use a voice activity detection technique to identify snippets 216 as time intervals in the recording that contain voice activity. The voice activity detection technique may identify and/or filter noise in the recording and classify fixed-duration frames (e.g., one-second frames) of the remaining audio signal as containing or not containing speech. Snippets 216 may then be defined and/or represented as consecutive frames in the recording that are classified as containing speech.

Processing engine 202 and/or another component may also, or instead, divide intervals of voice activity in the recording into smaller snippets 216. For example, the component may divide a five- to seven-second interval of voice activity into snippets 216 of individual phonemes, syllables, words, and/or other representations of speech that can be produced and/or processed by ASR engines 220.

Processing engine 202 identifies a set of possible transcriptions 226-228 of each snippet based on a subset of possible paths 218 spanned by the snippet. For example, processing engine 202 may identify transcriptions 226-228 of a snippet as linear sequences of terms 210 in possible paths 218 that are contained within the time interval spanned by the snippet. Each possible path may include words, phrases, and/or other units of speech from one or more transcript lattices 200 and/or ASR engines 220. In other words, a given possible path may be composed of a sequence of multiple sub-lattices from multiple ASR engines 220.

After possible transcriptions 226-228 for snippets 216 are identified, transcription engine 204 may select a best transcription (e.g., best transcriptions 242) of each snippet from the set of possible transcriptions 226-228. In particular, transcription engine 204 may divide ASR engines 220 into a set of contributor ASRs 222 and a different set of selector ASRs 224. Contributor ASRs 222 may represent ASR engines 220 that are used to generate best transcriptions 242 of snippets 216, and selector ASRs 224 may represent ASR engines 220 that produce transcriptions 228 for use in assessing the correctness or accuracy of transcriptions 226 from contributor ASRs 222.

Transcription engine 204 may use a number of criteria to select contributor ASRs 222 and selector ASRs 224 from the available ASR engines 220. For example, transcription engine 204 may identify contributor ASRs 222 as a certain number of ASR engines 220 with the best historical performance or accuracy in transcribing recordings and selector ASRs 224 as remaining ASR engines 220 that are not selected as contributor ASRs 222. In another example, transcription engine 204 may select contributor ASRs 222 as ASR engines 220 with the best performance in generating transcripts under certain conditions associated with the recording (e.g., languages, dialects, accents, voices, speech patterns, noise characteristics, distortion, volume, audio quality, etc.). The conditions may be determined by analyzing the recording and/or metadata associated with the recording (e.g., metadata for a meeting captured in the recording).

Next, transcription engine 204 may input transcriptions 226-228 into a machine learning model 208. For example, machine learning model 208 may be an artificial neural network (ANN) and/or other type of model that accepts, as input, one transcription of a snippet from a contributor ASR and additional transcriptions 228 of the snippet from selector ASRs 224.

Input to the ANN may also, or instead, include features related to the corresponding transcriptions from the contributor ASR and selector ASRs 224. For example, the features may include the number of words in each transcription, a difference in the number of words in the transcription from the contributor ASR and the number of words in the transcription from each selector ASR, a pairwise word agreement or disagreement rate between the transcription from the contributor ASR and the transcription from each selector ASR, and/or the confidence of each ASR in the corresponding transcription.

For each inputted set of transcriptions 226-228 and/or associated features, machine learning model 208 may generate a score (e.g., scores 230) reflecting the accuracy or correctness of the transcription from the contributor ASR, based on the corresponding transcriptions 228 and/or distribution of transcriptions 228 produced by selector ASRs 224. For example, machine learning model 208 may produce a score that represents an estimate of the overall or cumulative error rate between the transcription from the contributor ASR and the corresponding collection of transcriptions 228 produced by selector ASRs 224. During calculation of the score, machine learning model 208 may apply different weights to certain transcriptions 228 and/or portions of one or more transcriptions 226-228 (e.g., words of different lengths, words at the beginning or end of each transcription, etc.). As a result, machine learning model 208 may use transcriptions 228 from selector ASRs 224 as "votes" regarding the correctness or accuracy of a transcription from a given contributor ASR.

More specifically, transcription engine 204 may input each transcription of a snippet from contributor ASRs 222 and the corresponding set of transcriptions 228 of the snippet from selector ASRs 224 into machine learning model 208 to generate a different score for the transcription from contributor ASRs 222. Transcription engine 204 may then compare scores 230 for all transcriptions 226 of the snippet from contributor ASRs 222 to select the best transcription of the snippet. For example, transcription engine 204 may sort transcriptions 226 by scores 230 and select the transcription with the best or highest score (e.g., similarity to the corresponding collection of transcriptions 228, accuracy, correctness, etc.) as the best transcription of the snippet.

After best transcriptions 242 are selected and/or identified for all snippets 216 of voice activity in the recording, transcription engine 204 and/or another component may generate a transcript of the recording from best transcriptions 242. For example, the component may order best transcriptions 242 by the positions of the corresponding snippets 216 within the transcript.

Analysis engine 232 may assess the performance and/or accuracy of machine learning model 208 in generating best transcriptions 242. More specifically, analysis engine 232 may input features related to best transcriptions 242 and/or the corresponding transcriptions 226 from contributor ASRs 222 and/or selector ASRs 224 into machine learning model 234, and machine learning model 234 may estimate scores 236 representing the accuracy of best transcriptions 242 based on the features.

As shown, features inputted into machine learning model 234 may include best transcription features 238, transcription features 240, pairwise comparison features 244, and recording features 246. Best transcription features 238 may include features that describe and/or are generated from best transcriptions 242, and transcription features 240 may include features that describe and/or are generated from other transcriptions 226-228 that are used to select and/or produce best transcriptions 242. For example, best transcription features 238 and transcription features 240 may be produced for one or more snippets in the recording and/or a transcription of the entire recording. Each set of features may include, but is not limited to, a length of a given transcription (e.g., a best transcription selected by machine learning model 208 or an ASR transcription), a confidence in the transcription, and/or a letters per second associated with the transcription.

Pairwise comparison features 244 may include features that are generated from pairs of transcriptions selected from best transcriptions 242 and transcriptions 226-228. For example, pairwise comparison features 244 may be produced between a best transcription of each snippet and every other transcription of the snippet produced by contributor ASRs 222 and/or selector ASRs 224. Pairwise comparison features 244 may also, or instead, be produced between pairs of transcriptions 226-228 produced by contributor ASRs 222 and/or selector ASRs 224.

Pairwise comparison features 224 may include measures of differences between the pairs of transcriptions. For example, pairwise comparison features 224 may include a pairwise word error rate representing the number of substitutions, insertions, and/or deletions between each pair of transcriptions divided by the length of one of the transcriptions. Such measures may also, or instead, include a difference in character length between each pair of transcriptions. Pairwise word error rates and/or character length differences may additionally be aggregated into an average pairwise word error rate and/or average character length difference across all pairs of transcriptions.

In one or more embodiments, pairwise comparison features 244 additionally include encodings of per-character differences between pairs of transcriptions. To produce the encodings, per-character differences between each pair of transcriptions may be stored in a matrix with a fixed width. Per-character differences along each column of the matrix may then be aggregated into a single numeric value, which is stored in a vector of the same fixed width. The vector may then be used as a fixed-length representation of the per-character differences that can be inputted into machine learning model 234. Vector-based encodings of per-character differences between transcriptions are described in further detail below with respect to FIG. 3.

Recording features 246 may include features that represent audio characteristics of the recording from which transcriptions 226-228 and best transcriptions 242 are generated. For example, recording features 246 may include the duration of audio associated with each snippet, the duration of the entire recording, and/or the offset of each snippet in the recording. Recording features 246 may also, or instead, include audio features such as a mel-frequency cepstral coefficient (MFCC), a perceptual linear prediction (PLP), a root mean square (RMS), a zero crossing rate, a spectral flux, a spectral energy, a chroma vector, and/or a chroma deviation.

In one or more embodiments, machine learning model 234 includes an ANN and/or another type of model that estimates scores 236 representing word error rates between best transcriptions 242 and ground truth transcriptions of the recording based on best transcription features 238, transcription features 240, pairwise comparison features 244, and/or recording features 246. For example, machine learning model 234 may estimate scores 236 as percentage and/or proportional differences between each "best transcription" associated with the recording and a corresponding ground truth transcription generated by a human from the recording.

After machine learning model 234 outputs an estimated word error rate for a given "best transcription" of a snippet and/or recording, analysis engine 232 may apply one or more thresholds to the word error rate to characterize the accuracy (e.g., accuracies 248) of the best transcription. For example, analysis engine 232 may include a first threshold for a high error rate (e.g., an error rate that exceeds a certain threshold) and a second threshold for a low error rate (e.g., an error rate that falls below a certain threshold) for the best transcription's estimated word error rate. If the estimated word error rate exceeds the first threshold, the best transcription may be characterized as highly inaccurate. If the estimated word error rate falls below the second threshold, the best transcription may be characterized as highly accurate. If the estimated word error rate falls between the first and second thresholds, the best transcription may be characterized as neither highly accurate nor highly inaccurate.

Analysis engine 232 may also determine a candidacy of the snippet and/or recording for human transcription based on the characterized accuracy of the best transcription. For example, analysis engine 232 may select one or more best transcriptions 242 with accuracies 248 that fall between the threshold for high accuracy and the threshold for low accuracy as candidates for human transcription.

Analysis engine 232 and/or another component may display and/or output the selected best transcriptions 242 in a user interface that is provided by interactive virtual meeting assistant 132 and/or separately from interactive virtual meeting assistant 132. For example, the component may provide a graphical user interface (GUI), web-based user interface, voice user interface, and/or other type of interface between a human and an electronic device. Users may interact with the user interface to provide user feedback related to the selected best transcriptions 242. For example, each user may interact with one or more user-interface elements to hear the recording and view the best transcription of the recording outputted by machine learning model 208. The user may also interact with one or more user-interface elements to confirm the correctness or accuracy of a best transcription of a snippet; select an alternative transcription of the snippet that is more accurate (e.g., a transcription from a different ASR engine); and/or manually input a correct transcription of the snippet.

In turn, transcription engine 204, analysis engine 232, and/or another component may update machine learning models 208 and 234 based on the user feedback. For example, the component may obtain human transcriptions of one or more snippets 216 from the user feedback and use differences between the human transcriptions and the corresponding best transcriptions 242 to retrain parameters (e.g., coefficients, weights, etc.) of machine learning model 208 and/or machine learning model 234. Such retraining may occur in an online, offline, and/or nearline basis to accommodate requirements or limitations associated with the performance or scalability of the system and/or the availability of best transcriptions 242 and/or the corresponding user feedback. As a result, machine learning model 208 may generate best transcriptions 242 that are closer to the ground truth transcriptions, and machine learning model 234 may estimate word error rates between best transcriptions 242 and the ground truth transcriptions more accurately.

Figure 3:
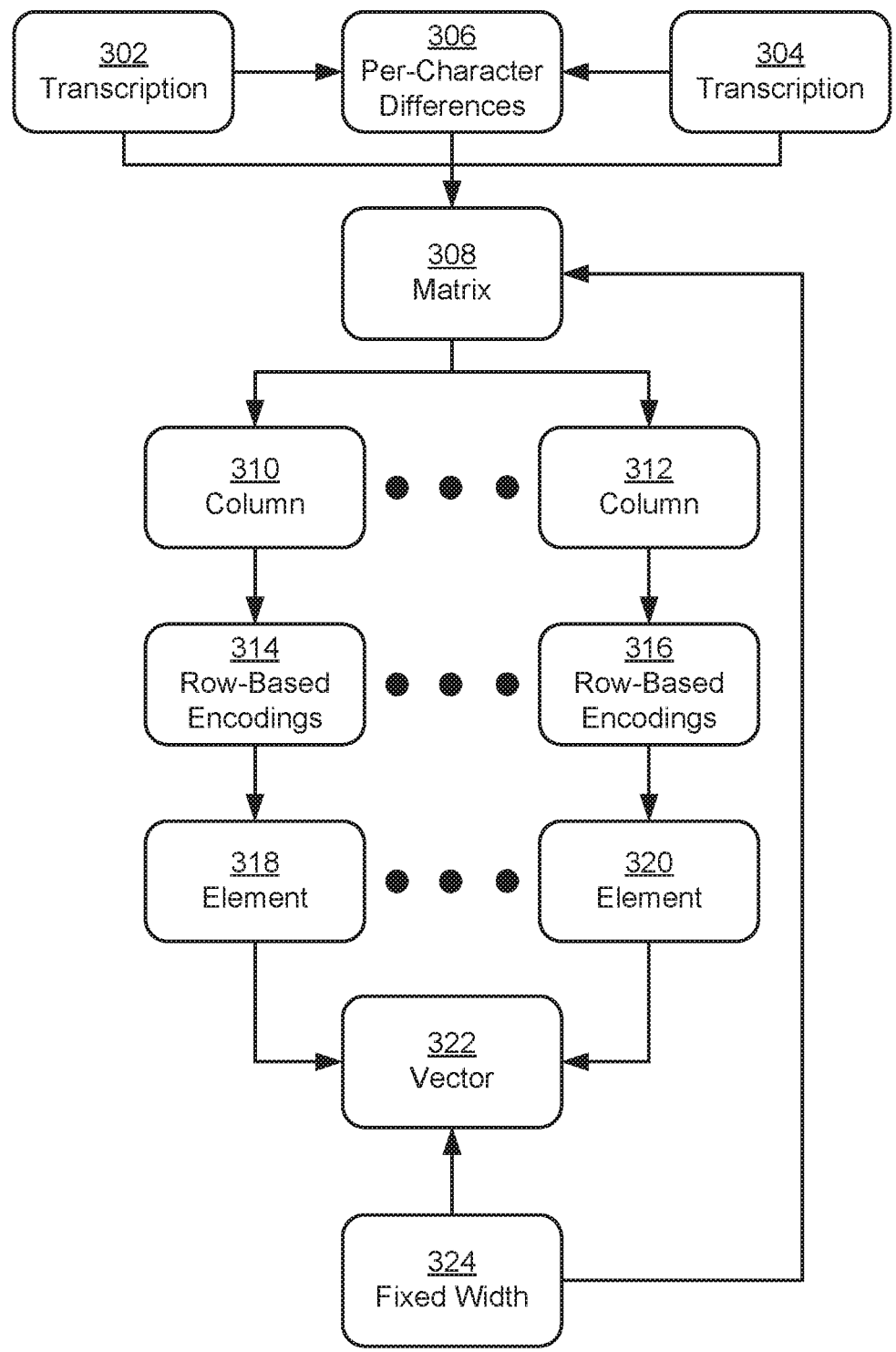
FIG. 3 is an illustration of the encoding of per-character differences between two transcriptions of a recording, according to various embodiments of the present invention.

FIG. 3 is an illustration of the encoding of per-character differences 306 between two transcriptions 302-304 of a recording, according to various embodiments of the present invention. As described above, transcriptions 302-304 may be generated by two different ASRs, or transcriptions 302-304 may include one "best transcription" of the recording produced by an ensemble model (e.g., machine learning model 208 of FIG. 2) and another transcription produced by an ASR from the recording.

Per-character differences 306 may include multiple types and/or sets of character-based changes between transcriptions 302-304. For example, a "cliff" utility or tool may be applied to transcriptions 302-304 to produce three sets of per-character differences 306 between transcriptions 302-304. One set of per-character differences 306 may contain character-level additions that are applied to one transcription to produce the other transcription (e.g., an addition of the letter 'd' to the end of "ad" to produce "add"). A second set of per-character differences 306 may contain character-level substitutions that are applied to one transcription to produce the other transcription (e.g., substituting 'i' in "will" with an 'e' to produce "well"). A third set of per-character differences 306 may contain character-level deletions that are applied to one transcription to produce the other transcription (e.g., deleting 's' from "dessert" to produce "desert").

Within a given set of per-character differences 306 (i.e., additions, substitutions, or deletions), each difference may be represented by a character associated with the change, as well as the position of the change with respect to one of the transcriptions. For example, per-character differences 306 between the strings "welcome" and "well come" may be represented as "wel<ins>l </ins>come" (i.e. insertion of the characters 'l' and ' ' after "wel" in the first string to produce the second string), or conversely as "wel<del>l </del>come" (i.e., deletion of the characters 'l' and ' ' after "wel" in the second string to produce the first string).

Each set of per-character differences 308 between transcriptions 302-304 is stored in a matrix 308 with a fixed width 324 (i.e., a fixed number of columns 310-312). More specifically, elements of matrix 308 may represent character positions in one transcription (e.g., the transcription to which per-character differences 306 are applied to produce the other transcription), with the characters wrapping around to subsequent rows in the matrix until all characters in the entire transcription have been assigned to different elements of matrix 308. Per-character differences 308 between the transcription and another transcription may then be stored at the corresponding elements of matrix 308.

For example, characters in the string "welcome to our meeting" may have the following mapping to elements of matrix 308:

$$\begin{bmatrix} w & e & l & c & o \\ m & e & & t & o \\ & o & u & r & \\ m & e & e & t & i \\ n & g & & & \end{bmatrix}$$

The above representation of matrix 308 includes a five-element fixed width 324 into which characters of the string are positioned. The first row of matrix 308 includes five elements representing the first five characters of the string (i.e., "welco"), the second row of matrix 308 includes five elements representing the second set of five characters from the string (i.e., "me to"), the third row of matrix 308 includes five elements representing the third set of five characters from the string (i.e., "our"), the fourth row of matrix 308 includes five elements representing the fourth set of five characters from the string (i.e., "meeti"), and the fifth row of matrix 308 includes five elements, the first two of which represent the last two characters in the string (i.e., "ng").

Continuing with the previous example, matrix 308 may store a set of per-character differences between the strings "welcome to our meeting" and "well come to hour meeting" as the following:

$$\begin{bmatrix} \text{null} & \text{null} & 2 & \text{null} & \text{null} \\ \text{null} & \text{null} & \text{null} & \text{null} & \text{null} \\ 1 & \text{null} & \text{null} & \text{null} & \text{null} \\ \text{null} & \text{null} & \text{null} & \text{null} & \text{null} \\ \text{null} & \text{null} & \text{null} & \text{null} & \text{null} \end{bmatrix}$$

More specifically, the above representation of matrix 308 may include counts of insertions into the first string to produce the second string. Within matrix 308, the third element of the first row includes two character insertions after the first three characters of the first string (i.e., insertion of "l" after "wel"). The first element of the third row includes one insertion after the first ten characters of the first string (i.e., insertion of 'h' after "welcome to"). All remaining elements of matrix 308 include null values.

Next, per-character differences 306 stored in individual columns 310-312 of matrix 308 are aggregated into corresponding elements 318-320 of a vector 322 with the same fixed width 324. More specifically, per-character differences 306 along each column of matrix 308 may be aggregated using row-based encodings 314-316 associated with different rows of matrix 308, and the aggregated row-based encodings 314-316 may be stored in elements 318-320 of vector 322.

To produce row-based encodings 314-316, the position of each row in matrix 308 may be represented by a corresponding prime number in the sequence of prime numbers. Thus, the first row of matrix 308 may be assigned the first prime number of 2, the second row of matrix 308 may be assigned the second prime number of 3, the third row of matrix 308 may be assigned the third prime number of 5, and so on.

When an element of matrix 308 in a given row contains a non-null numeric value (e.g., a value representing the number of insertions, substitutions, or deletions at a corresponding character of a transcription), the prime number may be raised to the value. Prime numbers along each column of matrix 308 may then be multiplied with one another to produce a single number that encodes all per-character differences 306 along the column, and the number may be stored in a corresponding element of vector 322 that is indexed by the column's position in matrix 308.

Continuing with the above example, the representation of matrix 308 that stores per-character differences 306 between the strings "welcome to our meeting" and "well come to hour meeting" may be converted into the following representation of vector 322:

[5 null 4 null null]

The first element of the above vector 322 includes a value of 5, which is obtained by raising the third prime number of 5 to the power of 1 stored in the first element of the third row of matrix 308. The third element of the above vector 322 includes a value of 4, which is obtained by raising the first prime number of 2 to the power of 2 stored in the third element of the first row of matrix 308.

In turn, vector 322 may be included as a fixed-size representation of a variable number of per-character differences 306 that is inputted into an ANN and/or other type of machine learning model 234 that accepts a fixed set of features. Because each element of vector 322 contains a number that can be factorized into a product of prime numbers, the number may encode the numbers and positions of per-character differences 306 along the corresponding column of matrix 308, which may allow machine learning model 234 to make predictions and/or inferences based on the encoded per-character differences 306.

Figure 4:
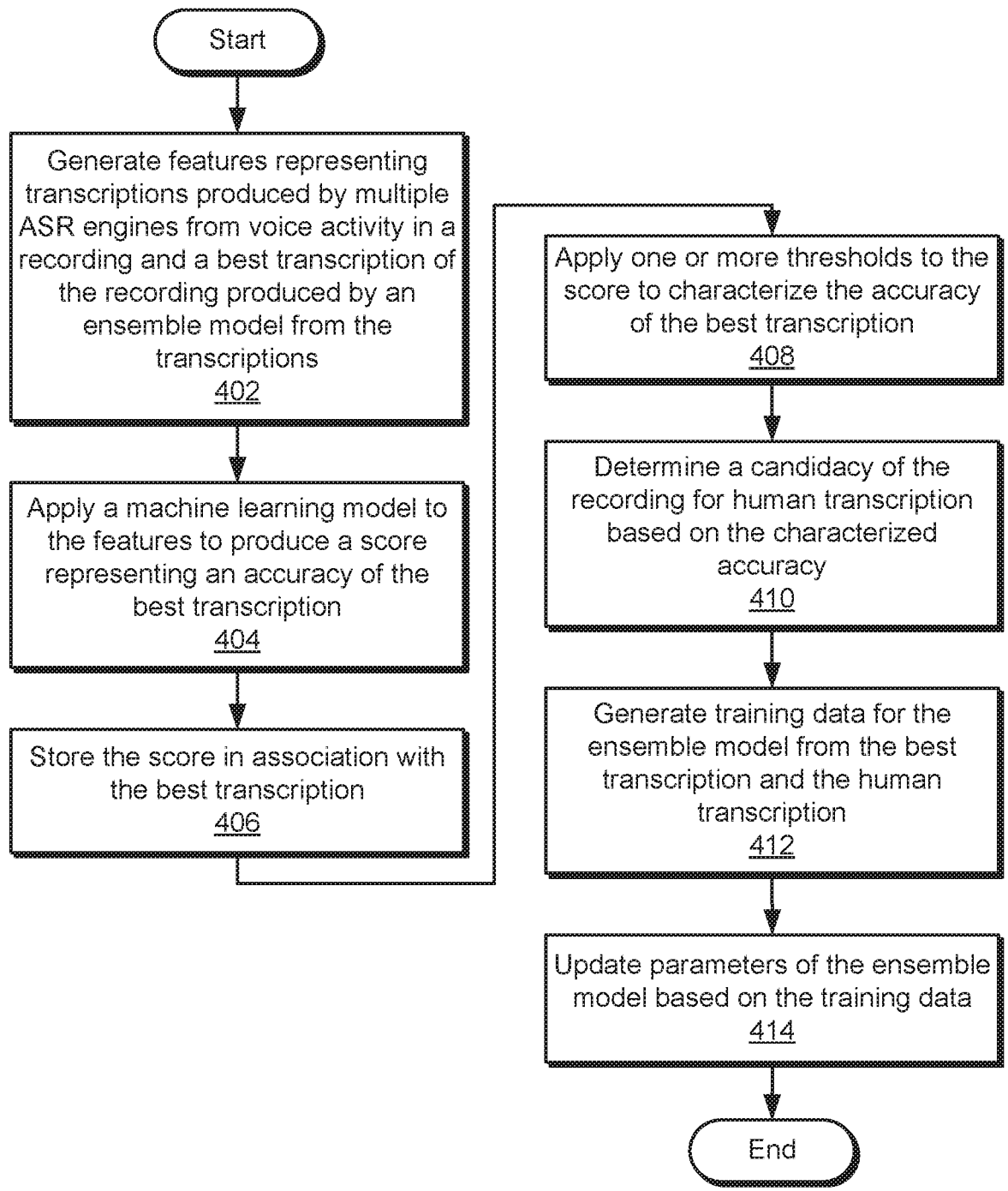
FIG. 4 is a flow diagram of method steps for analyzing a best transcription of a recording, according to various embodiments of the present invention.

FIG. 4 is a flow diagram of method steps for analyzing a best transcription of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, analysis engine 232 generates 402 features representing transcriptions produced by multiple ASR engines from voice activity in the recording and a best transcription of the recording produced by an ensemble model (e.g., machine learning model 208) from the transcriptions. For example, analysis engine 232 may generate a first set of features from the ASR transcriptions, a second set of features from pairwise comparisons of the transcriptions, a third set of features from the best transcription, and/or a fourth set of features from the recording. The first set of features may include a length of a transcription, a confidence in the transcription, and/or a letters per second associated with the transcription. The second set of features may include a word error rate between each pair of transcriptions, a difference in length between the pair of transcriptions, an average word error rate across all pairs of transcriptions, an average difference in length across all pairs of transcriptions, and/or a fixed-size encoding of per-character differences between two transcriptions. The third set of features may include a first feature representing a pairwise comparison of the best transcription and each of the transcriptions (i.e., any of the features in the second set, generated between the best transcription and each ASR transcription) and a second feature representing an attribute of the best transcription (i.e., any of the features in the first set, generated for the best transcription). The fourth set of features may include a duration of the voice activity, a position of the voice activity in the recording, and/or an audio feature (e.g., MFCC, PLP, RMS, zero crossing rate, spectral flux, spectral energy, chroma vector, chroma deviation, etc.).

Next, analysis engine 232 applies 404 a machine learning model to the features to produce a score representing an accuracy of the best transcription. For example, analysis engine 232 may output, based on the features, a numeric score ranging from 0 to 1 that represents the error rate of the best transcription, compared with a ground truth human transcription of the same recording. A low score may represent a low error rate, and a high score may represent a high error rate.

Analysis engine 232 stores 406 the score in association with the best transcription. For example, anaysis engine 232 may update a database, data warehouse, flat file, distributed filesystem, and/or another data store with a mapping between the best transcription and/or an identifier for the best transcription and the corresponding score outputted by the machine learning model.

Analysis engine 232 applies 408 one or more thresholds to the score to characterize the accuracy of the best transcription and subsequently determines 410 a candidate of the recording for human transcription based on the characterized accuracy. For example, analysis engine 232 may identify the recording as a candidate for human transcription when the score falls between a first threshold for a high error rate and a second threshold for a low error rate.

Analysis engine 232 and/or another component then generates 412 training data for the ensemble model from the best transcription and the human transcription. For example, the component may provide a user interface that outputs the best transcription and recording to users. The users may interact with the user interface to confirm the correctness or accuracy of the best transcription, select an alternative transcription that is more accurate (e.g., a transcription from a different ASR engine), and/or manually input a correct transcription of the recording.

Finally, the component updates 414 parameters of the ensemble model based on the training data 414. For example, the component may use differences between the human transcription and the best transcription to update parameters of the ensemble model. The component may optionally use the differences to update the parameters of the machine learning model used to characterize the accuracy of the best transcription, thereby improving subsequent estimates of best transcription accuracy by the machine learning model.

Figure 5:
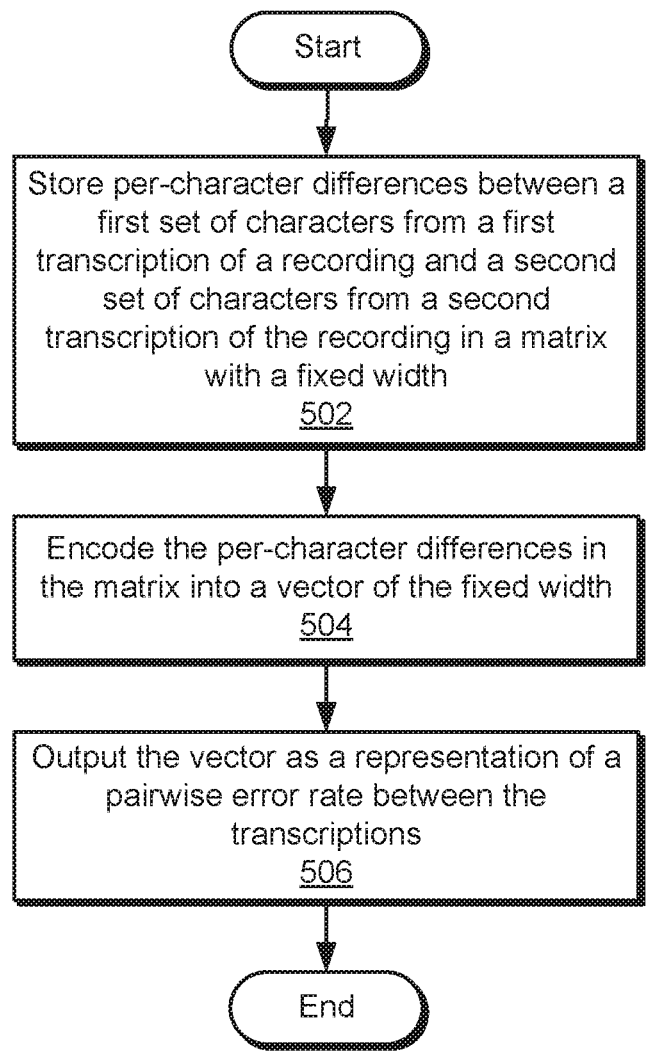
FIG. 5 is a flow diagram of method steps for analyzing pairs of transcriptions of a recording, according to various embodiments of the present invention.

FIG. 5 is a flow diagram of method steps for analyzing pairs of transcriptions of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, analysis engine 232 stores 502 per-character differences between a first set of characters from a first transcription of a recording and a second set of characters from a second transcription of the recording in a matrix with a fixed width. For example, analysis engine 232 may apply a "diff" operation to the transcriptions to identify one or more sets of per-character differences between the first and second sets of characters, with each set representing additions, substitutions, or deletions applied to one set of characters to produce the other set of characters.

Next, analysis engine 232 encodes 504 the per-character differences in the matrix into a vector of the fixed width. Encoding per-character differences between transcriptions into matrices and vectors of fixed width is described in further detail below with respect to FIG. 6.

Analysis engine 232 then outputs 506 the vector as a representation of a pairwise error rate between the transcriptions. For example, analysis engine 232 may store the vector as a feature associated with the pair of transcriptions. Analysis engine 232 may also, or instead, provide the vector as a feature that is inputted into a machine learning model that outputs a score representing the accuracy of one of the transcriptions, as discussed above.

Figure 6:
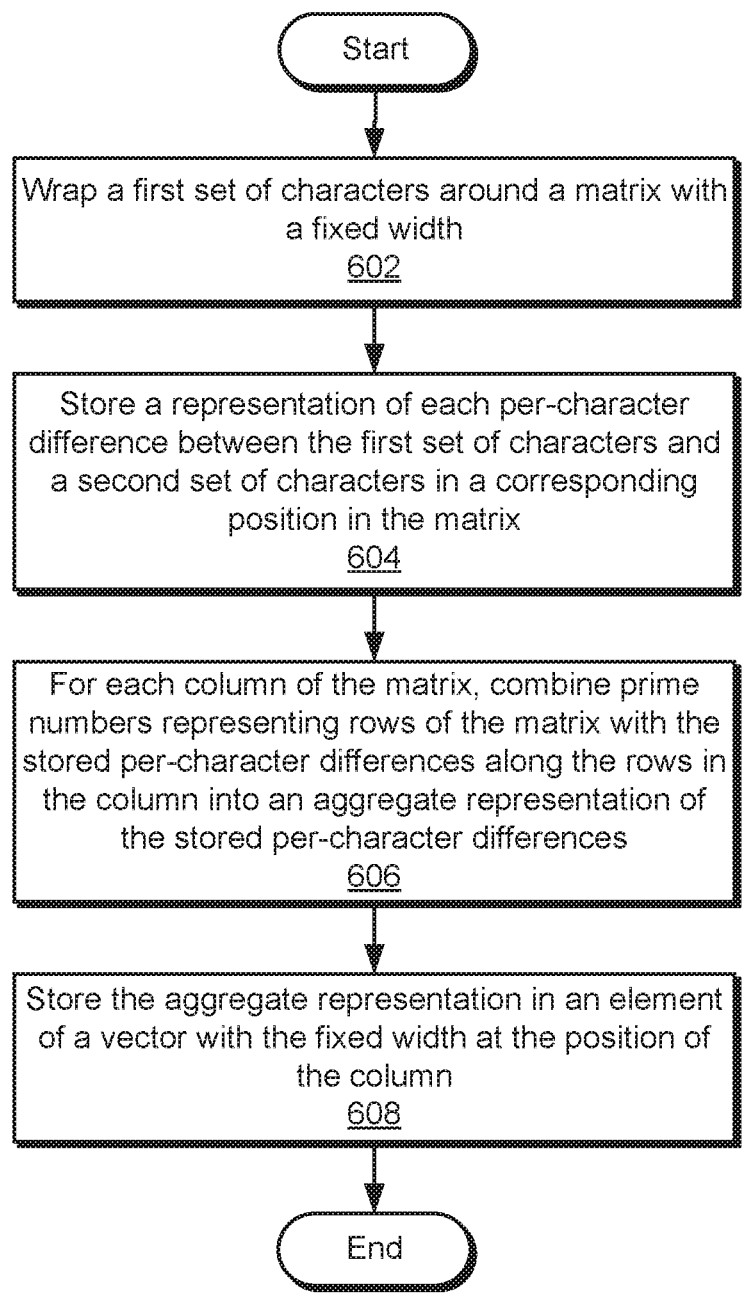
FIG. 6 is a flow diagram of method steps for encoding per-character differences between two transcriptions of a recording, according to various embodiments of the present invention.

FIG. 6 is a flow diagram of method steps for encoding per-character differences between two transcriptions of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, analysis engine 232 wraps 602 a first set of characters around a matrix with a fixed width. For example, analysis engine 232 may sequentially assign each character in the first set of characters to a corresponding element in the matrix. When all elements in a row of the matrix have been assigned to characters, additional characters in the first set of characters may be assigned to elements in a subsequent row of the matrix.

Next, analysis engine 232 stores 604 a representation of each per-character difference between the first set of characters and a second set of characters in a corresponding element in the matrix. For example, the first and second sets of characters may include two different transcriptions of the same recording. The number of additions, substitutions, or deletions applied to a given character's position in the first set to convert the first set of characters into the second set of characters may be stored in the corresponding element of the matrix.

For each column of the matrix, analysis engine 232 combines 606 prime numbers representing rows of the matrix with the stored per-character differences along the rows in the column into an aggregate representation of the stored per-character differences. For example, analysis engine 232 may denote the position of each row in the matrix by a corresponding prime number in the sequence of prime numbers. When an element of the column contains a numeric value representing the number of per-character differences of a certain type (e.g., additions, substitutions, or deletions) between the two sets of characters, analysis engine 232 may raise the prime number associated with the elements' row by the numeric value. Analysis engine 232 may then multiply all exponentiated prime numbers associated with the column to generate a single number that encodes all per-character differences stored in the column as a product of prime numbers, which represent the positions and numbers of per-character differences in the column.

Finally, analysis engine 232 stores 608 the aggregate representation in an element of a vector with the same fixed width at the position of the column. For example, analysis engine 232 may create the vector to have the same number of elements as the number of columns in the matrix. Analysis engine 232 may then store the numeric encoding of per-character differences along each column in the matrix in the corresponding element of the vector (i.e., the vector element that matches the column's position in the matrix).

In sum, the disclosed techniques can be used to assess and/or characterize the accuracy of a "best transcription" that is produced by an ensemble model from multiple ASR transcriptions of a recording. Features associated with the best transcription, ASR transcriptions, and/or recording may be inputted into a machine learning model that estimates the accuracy of the best transcription compared with a ground truth transcription that is produced by a human from the same recording. Differences between pairs of variable-length transcriptions may additionally be encoded into fixed-width vector representations to enable inclusion of the differences in a fixed set of features inputted into the machine learning model. When the machine learning model outputs an estimated accuracy that falls between a threshold for high accuracy and another threshold for low accuracy, the best transcription may be categorized as a candidate for human transcription to improve the performance of the machine learning model and/or ensemble model.

By identifying recordings as candidates for human transcription based on predicted accuracies of an ensemble model that generates "best transcriptions" of the recordings, the disclosed embodiments may streamline the generation of additional training data that is likely to improve the performance of the ensemble model. In turn, the increased accuracy of the ensemble model may reduce reliance on human transcriptions of the recordings and/or improve the usefulness of the best transcriptions to users. Consequently, the disclosed techniques provide technological improvements in the accuracy and/or performance of ASR engines, ensemble models, interactive virtual meeting assistants, and/or other applications or devices that are used to manage, review, and/or analyze recordings or transcriptions of meetings or other types of events.

1. In some embodiments, a method for analyzing a transcription of a recording comprises generating features representing transcriptions produced by multiple automatic speech recognition (ASR) engines from voice activity in the recording and a best transcription of the recording produced by an ensemble model from the transcriptions; applying a machine learning model to the features to produce a score representing an accuracy of the best transcription; and storing the score in association with the best transcription.

2. The method of clause 1, further comprising applying one or more thresholds to the score to characterize the accuracy of the best transcription; and determining a candidacy of the recording for human transcription based on the characterized accuracy of the best transcription.

3. The method of clauses 1-2, further comprising generating training data for the ensemble model from the best transcription and the human transcription; and updating parameters of the ensemble model based on the training data.

4. The method of clauses 1-3, wherein determining the candidacy of the recording for human transcription based on the characterized accuracy of the best transcription comprises identifying the recording as a candidate for human transcription when the score falls between a first threshold for a high error rate and a second threshold for a low error rate.

5. The method of clauses 1-4, wherein generating the features representing the transcriptions produced by the multiple ASR engines from voice activity in the recording and the best transcription of the recording produced by the ensemble model from the transcriptions comprises generating a first set of features from the transcriptions; generating a second set of features from pairwise comparisons of the transcriptions; generating a third set of features from the best transcription; and generating a fourth set of features from the recording.

6. The method of clauses 1-5, wherein the first set of features comprises a length of a transcription, a confidence in the transcription, and a letters per second associated with the transcription.

7. The method of clauses 1-6, wherein the second set of features comprises a word error rate between two transcriptions, an average word error rate across all pairs of transcriptions, an difference in length between the two transcriptions, and an average difference in length across all pairs of transcriptions.

8. The method of clauses 1-7, wherein the third set of features comprises a first feature representing a pairwise comparison of the best transcription and each of the transcriptions and a second feature representing an attribute of the best transcription.

9. The method of clauses 1-8, wherein the fourth set of features comprises a duration of the voice activity, a position of the voice activity in the recording, and an audio feature.

10. The method of clauses 1-9, wherein the audio feature comprises at least one of a mel-frequency cepstral coefficient (MFCC), a perceptual linear prediction (PLP), a root mean square (RMS), a zero crossing rate, a spectral flux, a spectral energy, a chroma vector, and a chroma deviation.

11. The method of clauses 1-10, wherein the second set of features comprises a fixed-size encoding of per-character differences between two transcriptions.

12. The method of clauses 1-11, wherein the machine learning model comprises an artificial neural network.

13. In some embodiments, a non-transitory computer readable medium stores instructions that, when executed by a processor, cause the processor to perform the steps of generating features representing transcriptions produced by multiple automatic speech recognition (ASR) engines from voice activity in the recording and a best transcription of the recording produced by an ensemble model from the transcriptions; applying a machine learning model to the features to produce a score representing an accuracy of the best transcription; and storing the score in association with the best transcription.

14. The non-transitory computer readable medium of clause 13, wherein the steps further comprise applying one or more thresholds to the score to characterize the accuracy of the best transcription; and determining a candidacy of the recording for human transcription based on the characterized accuracy of the best transcription.

15. The non-transitory computer readable medium of clauses 13-14, wherein the steps further comprise generating training data for the ensemble model from the best transcription and the human transcription; and updating parameters of the ensemble model based on the training data.

16. The non-transitory computer readable medium of clauses 13-15, wherein generating the features representing the transcriptions produced by the multiple ASR engines from voice activity in the recording and the best transcription of the recording produced by the ensemble model from the transcriptions comprises generating a first set of features from the transcriptions; generating a second set of features from pairwise comparisons of the transcriptions; generating a third set of features from the best transcription; and generating a fourth set of features from the recording.

17. The non-transitory computer readable medium of clauses 13-16, wherein the first set of features and third set of features comprise a length of a transcription, a confidence in the transcription, and a letters per second associated with the transcription 18. The non-transitory computer readable medium of clauses 13-17, wherein the second set of features and third set of features comprises a word error rate between two transcriptions, an average word error rate across all pairs of transcriptions, an difference in length between the two transcriptions, and an average difference in length across all pairs of transcriptions.

19. The non-transitory computer readable medium of clauses 13-18, wherein the fourth set of features comprises a duration of the voice activity, a position of the voice activity in the recording, and an audio feature.

20. In some embodiments, a system comprises a memory that stores instructions; and a processor that is coupled to the memory and, when executing the instructions, is configured to generate features representing transcriptions produced by multiple automatic speech recognition (ASR) engines from voice activity in the recording and a best transcription of the recording produced by an ensemble model from the transcriptions; apply a machine learning model to the features to produce a score representing an accuracy of the best transcription; and store the score in association with the best transcription.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for analyzing a transcription of a recording, comprising:
   generating features representing transcriptions produced by multiple automatic speech recognition (ASR) engines from voice activity in a recording;
   generating a best transcription of the recording produced by an ensemble model from the transcriptions;
   applying a machine learning model to the features to produce a score representing an accuracy of the best transcription, wherein applying the machine learning model to the features to produce the score representing the accuracy of the best transcription comprises:
      determining a predetermined number of the multiple ASR engines having historical performance in generating transcripts that are better than the historical performance of a remaining number of the multiple ASR engines under predetermined conditions as contributor ASR engines, the pre-determined conditions comprising a selected metadata associated with the recording,
      determining a remaining number of the multiple ASR engines as selector ASR engines, and
      applying the machine learning model to produce the score representing error rates between the best transcription and the transcriptions from the selector ASR engines; and
   storing the score in association with the best transcription.

2. The method of claim 1, wherein generating the features representing the transcriptions produced by the multiple ASR engines from voice activity in the recording and the best transcription of the recording produced by the ensemble model from the transcriptions comprises:
   generating a first set of features from the transcriptions;
   generating a second set of features from pairwise comparisons of the transcriptions;
   generating a third set of features from the best transcription; and
   generating a fourth set of features from the recording.

3. The method of claim 2, wherein the fourth set of features comprises a duration of the voice activity, a position of the voice activity in the recording, and an audio feature.

4. The method of claim 3, wherein the audio feature comprises at least one of a mel-frequency cepstral coefficient (MFCC), a perceptual linear prediction (PLP), a root mean square (RMS), a zero crossing rate, a spectral flux, a spectral energy, a chroma vector, and a chroma deviation.

5. The method of claim 2, wherein the first set of features comprises a length of a transcription, a confidence in the transcription, and a letters per second associated with the transcription.

6. The method of claim 2, wherein the second set of features comprises a word error rate between two transcriptions, an average word error rate across all pairs of transcriptions, a difference in length between the two transcriptions, and an average difference in length across all pairs of transcriptions.

7. The method of claim 2, wherein the third set of features comprises a first feature representing a pairwise comparison of the best transcription and each of the transcriptions and a second feature representing an attribute of the best transcription.

8. The method of claim 2, wherein the second set of features comprises a fixed-size encoding of per-character differences between two transcriptions.

9. The method of claim 1, further comprising:
   applying one or more thresholds to the score to characterize the accuracy of the best transcription; and
   determining a candidacy of the recording for human transcription based on the characterized accuracy of the best transcription.

10. The method of claim 9, further comprising:
    generating training data for the ensemble model from the best transcription and the human transcription; and
    updating parameters of the ensemble model based on the training data.

11. The method of claim 9, wherein determining the candidacy of the recording for the human transcription based on the characterized accuracy of the best transcription comprises:
    identifying the recording as a candidate for the human transcription when the score falls between a first threshold for a high error rate and a second threshold for a low error rate.

12. The method of claim 1, wherein the machine learning model comprises an artificial neural network.

13. A non-transitory computer readable medium storing instructions that, when executed by a processor, cause the processor to perform the steps of:
generating features representing transcriptions produced by multiple automatic speech recognition (ASR) engines from voice activity in the recording and a best transcription of the recording produced by an ensemble model from the transcriptions;
applying a machine learning model to the features to produce a score representing an accuracy of the best transcription, wherein applying the machine learning model to the features to produce the score representing the accuracy of the best transcription comprises:
determining a predetermined number of the multiple ASR engines having historical performance in generating transcripts that are better than the historical performance of a remaining number of the multiple ASR engines under predetermined conditions as contributor ASR engines, the pre-determined conditions comprising a selected metadata associated with the recording,
determining a remaining number of the multiple ASR engines as selector ASR engines, and
applying the machine learning model to produce the score representing error rates between the best transcription and the transcriptions from the selector ASR engines; and
storing the score in association with the best transcription.

14. The non-transitory computer readable medium of claim 13, wherein generating the features representing the transcriptions produced by the multiple ASR engines from voice activity in the recording and the best transcription of the recording produced by the ensemble model from the transcriptions comprises:
generating a first set of features from the transcriptions;
generating a second set of features from pairwise comparisons of the transcriptions;
generating a third set of features from the best transcription; and
generating a fourth set of features from the recording.

15. The non-transitory computer readable medium of claim 14, wherein the first set of features and third set of features comprise a length of a transcription, a confidence in the transcription, and a letters per second associated with the transcription.

16. The non-transitory computer readable medium of claim 14, wherein the fourth set of features comprises a duration of the voice activity, a position of the voice activity in the recording, and an audio feature.

17. The non-transitory computer readable medium of claim 13, wherein the steps further comprise:
applying one or more thresholds to the score to characterize the accuracy of the best transcription; and
determining a candidacy of the recording for human transcription based on the characterized accuracy of the best transcription.

18. The non-transitory computer readable medium of claim 17, wherein the steps further comprise:
generating training data for the ensemble model from the best transcription and the human transcription; and
updating parameters of the ensemble model based on the training data.

19. The non-transitory computer readable medium of claim 14, wherein the second set of features and third set of features comprise a word error rate between two transcriptions, an average word error rate across all pairs of transcriptions, a difference in length between the two transcriptions, and an average difference in length across all pairs of transcriptions.

20. A system, comprising:
a memory that stores instructions; and
a processor that is coupled to the memory and, when executing the instructions, is configured to:
generate features representing transcriptions produced by multiple automatic speech recognition (ASR) engines from voice activity in the recording and a best transcription of the recording produced by an ensemble model from the transcriptions;
apply a machine learning model to the features to produce a score representing an accuracy of the best transcription, wherein applying the machine learning model to the features to produce the score representing the accuracy of the best transcription comprises:
determining a predetermined number of the multiple ASR engines having historical performance in generating transcripts that are better than the historical performance of a remaining number of the multiple ASR engines under predetermined conditions as contributor ASR engines, the pre-determined conditions comprising a selected metadata associated with the recording,
determining a remaining number of the multiple ASR engines as selector ASR engines, and
applying the machine learning model to produce the score representing error rates between the best transcription and the transcriptions from the selector ASR engines; and
store the score in association with the best transcription.

* * * * *